US011488564B2

United States Patent
Swatek et al.

(10) Patent No.: US 11,488,564 B2
(45) Date of Patent: Nov. 1, 2022

(54) DISPLAY DEVICE HAVING GAP WIDTH MEASURING DEVICE BETWEEN PANELS AND CONTROL METHOD THEREFOR

(71) Applicant: KAMARA Werbe und Kommunikations GmbH, Vienna (AT)

(72) Inventors: Alexander Swatek, Guessing (AT); Elmar Stoeger, Bad Erlach (AT); Markus Kirschner, Moedling (AT); Bernhard Schuh, Vienna (AT)

(73) Assignee: KAMARA Werbe und Kommunikations GmbH, Vienna (AT)

( * ) Notice: Subject to any disclaimer, the term of this patent is extended or adjusted under 35 U.S.C. 154(b) by 0 days.

(21) Appl. No.: 17/357,538

(22) Filed: Jun. 24, 2021

(65) Prior Publication Data

US 2022/0005438 A1 Jan. 6, 2022

(30) Foreign Application Priority Data

Jul. 1, 2020 (EP) .................................... 20183454

(51) Int. Cl.
*G09G 5/10* (2006.01)
*G09G 3/00* (2006.01)
*G09F 9/30* (2006.01)

(52) U.S. Cl.
CPC ............... *G09G 5/10* (2013.01); *G09F 9/301* (2013.01); *G09G 3/035* (2020.08);
(Continued)

(58) Field of Classification Search
CPC .... G09G 5/10; G09G 3/035; G09G 2300/026; G09G 2320/0686; G09G 2360/16;
(Continued)

(56) References Cited

U.S. PATENT DOCUMENTS

| 6,741,222 B1 * | 5/2004 | Tucker | G09F 9/33 345/1.1 |
| 2002/0122134 A1 * | 9/2002 | Kalua | G09F 9/33 348/836 |

(Continued)

FOREIGN PATENT DOCUMENTS

| AT | 515846 B1 | 9/2016 |
| CN | 102842285 B | 6/2015 |

(Continued)

OTHER PUBLICATIONS

Extended European Search Report received for European Patent Application No. 20183454.6, dated Nov. 24, 2020, 16 pages (9 pages of Official Copy and 7 pages of English Translation).

*Primary Examiner* — Richard J Hong
(74) *Attorney, Agent, or Firm* — Fiala & Weaver P.L.L.C.

(57) ABSTRACT

The disclosed subject matter relates to a display device having at least a first and a second panel, each of which comprises luminous elements arranged in rows and columns and which can be aligned with one another to form a gap running parallel to the columns, at least one connecting element for holding the panels in their aligned position, a measuring device which determines a width of the gap for a row of the first panel, and a driver which controls said luminous element as a function of both the signal and the gap width determined for said row. The disclosed subject matter further relates to a panel and a control method for said display device.

13 Claims, 4 Drawing Sheets

Figure 1:
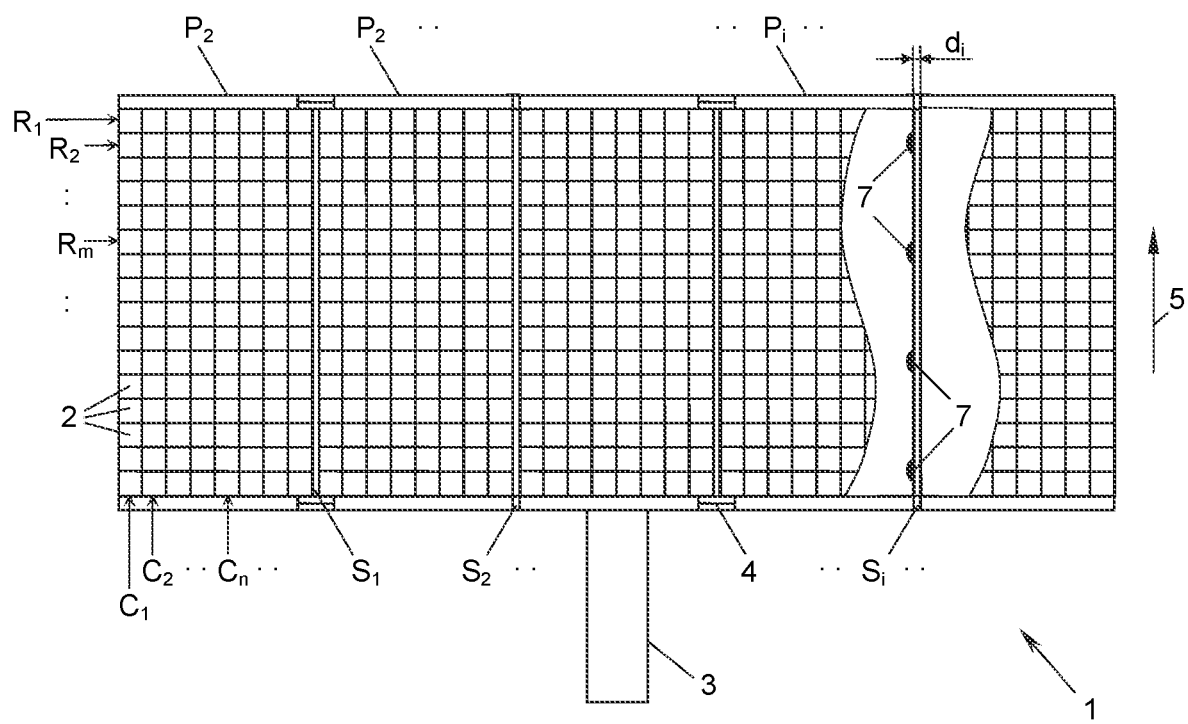

(52) U.S. Cl.
CPC ............. *G09G 2300/026* (2013.01); *G09G 2320/0686* (2013.01); *G09G 2360/16* (2013.01); *G09G 2380/02* (2013.01)

(58) Field of Classification Search
CPC .. G09G 2380/02; G09G 3/3413; G09F 9/301; G09F 7/002; G09F 9/33; G06T 3/20; G06T 7/13; G06F 3/1446; G02B 5/0205; H05B 45/30; G09B 5/12; G09B 3/32
See application file for complete search history.

(56) References Cited

U.S. PATENT DOCUMENTS

| | | | |
|---|---|---|---|
| 2005/0210722 A1* | 9/2005 | Graef | G09F 9/33 40/452 |
| 2011/0102300 A1* | 5/2011 | Wood | G06F 3/1446 345/1.3 |
| 2012/0147463 A1* | 6/2012 | Jung | G09F 7/002 359/443 |
| 2015/0002371 A1* | 1/2015 | Burgess | G09G 5/12 345/1.2 |
| 2016/0224306 A1* | 8/2016 | Rycyna, III | G09G 3/32 |
| 2018/0005606 A1* | 1/2018 | Mori | G09G 3/3413 |
| 2018/0139422 A1* | 5/2018 | Moule | G06T 7/13 |
| 2019/0086724 A1* | 3/2019 | Shih | G02B 5/0205 |
| 2020/0211155 A1* | 7/2020 | Ma | G06T 3/20 |
| 2020/0251048 A1* | 8/2020 | Im | H05B 45/30 |

FOREIGN PATENT DOCUMENTS

| | | |
|---|---|---|
| EP | 2568464 B1 | 4/2014 |
| EP | 2443621 B1 | 3/2015 |
| WO | 2013/051063 A1 | 4/2013 |
| WO | 2019/066594 A1 | 4/2019 |

* cited by examiner

DISPLAY DEVICE HAVING GAP WIDTH MEASURING DEVICE BETWEEN PANELS AND CONTROL METHOD THEREFOR

CROSS-REFERENCE TO RELATED APPLICATION(S)

This application claims priority to European Patent Application No. 20 183 454.6, filed on Jul. 1, 2020, the entirety of which is incorporated herein by reference.

BACKGROUND

Technical Field

The present disclosed subject matter relates to a display device comprising at least a first and a second panel, each of which comprises luminous elements arranged in rows and columns and which can be aligned with one another to form a gap running parallel to the columns, and at least one connecting element for holding the panels in their aligned position. The disclosed subject matter further relates to a panel, particularly for such a display device, and a method for controlling such a display device.

Background Art

Modular display devices of this type are used to form a common flat or curved image area from a plurality of aligned panels and to reproduce image or video signals by means of their luminous elements ("pixels"). Light-emitting diodes (LEDs), for example, made of organic materials (OLEDs), are often used as luminous elements. Due to their modularity, there is a wide range of applications from large stationary video walls in stadiums or on buildings to mobile large screens temporarily set up on site for events to foldable TV, computer or mobile phone screens that can be stowed away to save space in the folded state, for example, as disclosed in the documents EP 2 443 621 B1, EP 2 568 464 B1 or AT 515 846 B1.

In all of these applications, gaps between the panels can significantly impair the image quality when the gap width and the variation thereof along the gap cause uneven luminous element spacings and therefore disturbing irregularities in image brightness that are perceptible to the human eye. For example, gaps which fall below or exceed a regular luminous element spacing appear lighter or darker to the viewer than the rest of the image area.

However, setting and maintaining the correct gap between two panels, that is, ensuring a regular luminous element spacing across the panel boundaries, is difficult in practice due to component tolerances, component aging, thermal expansion and wind. A certain minimum gap width is often required not only to accommodate component tolerances and thermal expansion, but also to prevent the luminous elements from hitting one another at the gap in the event of vibrations or wind, which can lead to damage to the luminous elements close to the gap. Especially in the case of high-resolution display devices having luminous element spacing in the sub-millimeter range, the gap width can often not be reduced to the same extent, be it because of production-related component tolerances or necessary minimum housing wall thicknesses of the luminous elements, so that excessive gaps here are also due to the design.

In the case of mobile display devices for the event area, which are frequently set up and dismantled, different gap widths arise between the panels each time they are set up again, for example, when they are plugged together or screwed. Particularly in the case of foldable display devices, for example, for the home cinema sector or for portable electrical devices, a slightly changed gap width is also always created with each unfolding due to the necessary bearing clearance. This effect can intensify over time due to aging phenomena such as the bearings of the folding mechanism wearing out or knocking out.

BRIEF SUMMARY

The goal of the disclosed subject matter is to create display devices, panels and control methods therefor which overcome the mentioned disadvantages of the known art and contribute to decreasing the visibility of construction-related or operational gaps between the panels.

This goal is achieved in a first aspect of the disclosed subject matter with a display device, comprising
at least a first and a second panel, each of which comprises luminous elements arranged in rows and columns and which can be aligned with one another to form a gap running parallel to the columns,
at least one connecting element for holding the panels in their aligned position,
a measuring device which is configured to determine, for a row of the first panel, a width of the gap at the level of said row, and
a driver which receives a signal to be displayed and is connected to the measuring device and at least one luminous element of said row, which driver is configured to control said luminous element as a function of both the signal and the gap width determined for said row.

It is to be understood that the panels considered here can lie next to one another as well as one below the other, wherein, in the first case, the rows run horizontally and in the second case vertically, that is, in both cases normal to the gap.

The display device according to the disclosed subject matter uses a psycho-optical effect ("optical illusion") to dynamically correct the visibility of the gaps between the panels: On the basis of an individual measurement of the gap width between two panels by means of the measuring device, the driver scales the image or video signal to be reproduced by the luminous elements so that the physically existing gap between the two panels is less perceived by the viewer. For example, when the gap width exceeds the average luminous element spacing, that is, when the gap is too large, the driver can increase the brightness of luminous elements close to the gap in order to make the otherwise darker gap no longer perceptible to the human eye as dark. To do this, the driver multiplies, for example, the video signal for the luminous element(s) closest to the gap in a row by a factor greater than one, for example, to lengthen the pulse duration of pulse-width modulated luminous elements or to increase the voltage applied to voltage-controlled luminous elements, or the driver, when the gap is too small, decreases the brightness of the luminous element(s) close to the gap in order to make the gap, which otherwise appears brighter, less noticeable to the viewer.

Generally speaking, the driver can be configured to increase the brightness of at least one luminous element closer to the gap relative to the brightness of at least one luminous element further away from the gap, when the determined gap width is greater than an average distance between the luminous elements in said row, and to decrease said brightness when the determined gap width is smaller than the average distance between the luminous elements in said row. The increase in brightness of the luminous elements close to the gap, which is required to compensate for perception of the overly large gap, can thus be achieved in three ways: by increasing the brightness of the luminous elements close to the gap, by reducing the brightness of the luminous elements distant from the gap, or both; and all this vice versa to compensate for perceptions of an overly small gap. Overdriving of the luminous elements can also be prevented by appropriate selection among these options, as is described in more detail later.

The gap compensation according to the disclosed subject matter is suitable for all types of display devices composed of panels. The connecting elements between the panels can accordingly be rigid or articulated, detachable or non-detachable. In a first embodiment of the disclosed subject matter, the connecting element for holding and aligning two panels is, for example, a common carrier on which the panels are mounted, or one or more tabs, adhesive, riveted or welded seams, via which the panels are connected to one another.

The present disclosed subject matter is particularly advantageous for display devices having movable and/or detachably couplable panels, for example, foldable or pluggable panels. In a second embodiment of the disclosed subject matter, the connecting element is therefore a joint, via which the panels can be pivoted between the aligned position and a folded position. For example, the display device can be folded up like a fan-fold, that is, the panels can be folded onto one another in a zigzag shape by means of the joints, as described in the documents EP 2 443 621 B1, EP 2 568 464 B1 and AT 515846 B1.

In a further third embodiment of the disclosed subject matter, the connecting element is a coupling via which the panels are detachably connected. The coupling can, for example, be a plug-in or screw coupling directly between the panels, or a common carrier with which the panels can be detachably coupled. In the case of transportable display devices for the event area, the panels can easily be detached from one another, temporarily stored and transported individually in a space-saving manner and then coupled together for reconstruction.

The measuring device can be used once after each (re-) alignment of the panels to determine the current gap width(s), on the basis of which the driver controls the luminous elements to reduce the gap visibility. In order to also compensate for temporal changes in the gap width during operation, for example, due to thermal expansion, component aging and deformation, weather influences, etc., it is particularly advantageous when the measuring device is configured to continuously determine said gap width during operation of the display device. "Continuously" in this context means that the measuring device determines the gap width continuously or at—e.g., regular—time intervals, for example, every second, minute, hour, etc., for one or more rows. The driver then controls the luminous elements on the basis of the currently determined gap width, so to speak "dynamically" according to the relative position and relative movement of the panels in order to achieve the described reduction in gap visibility.

In the simplest case, the measuring device can comprise only one sensor which determines a single, uniform gap width for all rows of the display device. However, the measuring device optionally comprises at least two sensors spaced apart from one another in the longitudinal extension direction of the gap, of which the first measures a first width of the gap at the level of the first sensor and the second measures a second width of the gap at the level of the second sensor, wherein the measuring device is configured to determine the gap width at the level of said row on the basis of the measured first and second widths. In this way, a gap that widens or narrows over the longitudinal extent of the gap, for example, between panels that are misaligned at an angle, can be measured. From the measured values of the two sensors, the measuring device can then determine the respective gap width for each row lying between or outside the two sensors through appropriate interpolation or extrapolation.

Each sensor can either be arranged entirely on the one panel or entirely on the other panel in order to measure the gap width at the level thereof, or it can consist of two sensor parts lying opposite one another on both sides of the gap and distributed on the panels, which sensor parts measure the gap width between one another. In the case of sensors lying entirely on one or the other panel, when using two sensors, the one sensor could be arranged on the first panel and the other sensor on the second panel in order to reduce the number of sensors required per panel.

In order to be able to determine any profiles of the gap width beyond a linear gap width change, the measuring device can also comprise three or more sensors in further embodiments and use the gap widths measured by said sensors for a corresponding curve interpolation or extrapolation to determine the gap width at the level of each row.

In a first variant of the disclosed subject matter, each panel of the display device can be equipped with its own measuring device and its own driver and independently carry out said brightness control of its luminous elements to compensate for the perception of the gap. The brightness control can take place either on one side, wherein each panel is associated with its own gap that is perception-compensated only by means of its luminous elements, for example, the gap to the left of the panel, or on both sides, wherein one gap is associated with a plurality of panels, by means of the luminous elements of which the gap is perception-compensated. In an alternative, second variant of the disclosed subject matter, two adjacent panels can share a measuring device, that is, the measuring device of the first panel is configured to also determine a width of the gap at the level of said row for at least one row of the second panel, and said driver of the first panel, or a corresponding further driver of the second panel, is configured to control at least one luminous element of said row of the second panel as a function of the gap width determined therefor. The number of components can thereby be reduced. In addition, when controlling the luminous elements of both panels, that is, on both sides of the gap, the brightness reserve ("headroom") required to avoid overdriving the luminous elements close to the gap if the gaps are too large can be halved and, conversely, the drive range of all luminous elements that can be used to reproduce the video signal can thus be increased.

The luminous elements of a panel can be controlled as a function of the width of only a single gap, particularly the luminous elements close to the gap and/or in a panel on the edge of the display device which comprises only one adjacent panel. In panels having more than one adjacent panel, that is, when the display device comprises at least a "third" panel which can be aligned with the first panel to form a further gap, the measuring device can optionally also be configured to determine a width of said further gap, and the driver can be configured to control said luminous element also as a function of the determined width of the further gap. Said further gap can either run parallel to the rows or parallel to the columns of the first panel, that is, the first, second and third panels can be arranged linearly next to one another or in an L-shape ("across the corner"). Controlling the luminous elements of the middle panel of such a group of three as a function of the two gap widths makes it possible to simultaneously both to reduce the visibility of both gaps and to maximize the brightness of the luminous elements for the reproduction of the image or video signal. For example, when the gaps are too large, the brightness reserve that is required to increase the brightness of luminous elements close to the gap to reduce their visibility can be determined on the basis of the largest of all determined gap widths in order to simultaneously reduce the gap visibility, achieve maximum brightness for video signal reproduction and prevent overdriving of luminous elements close to the gap.

The display device can comprise further panels that can be aligned with the first panel, for example, a fourth, fifth, etc., whereby the visibility of all further gaps thus formed can be reduced by determining the respective gap widths and controlling the luminous elements on the basis of the determined gap widths.

In a second aspect, the disclosed subject matter provides a panel, particularly for the display device described above, which comprises luminous elements arranged in rows and columns and can be aligned with at least one second panel, to form a gap running parallel to the columns, which panel is characterized by a measuring device according to the disclosed subject matter which is configured, for a row of the panel, to determine a width of the gap at the level of said row, and a driver that receives a signal to be displayed and is connected to the measuring device and at least one luminous element of said row and is configured to control said luminous element as a function of both the signal and the gap width determined for said row.

The panel of the disclosed subject matter enables strict modularization of the display device. A plurality of panels of the same type can be put together like building blocks. As a result, a wide variety of display devices can be built cost-effectively from the same standardized modules, namely panels and respectively associated connecting elements, measuring devices, sensors and drivers, which considerably simplifies production, storage, sales and assembly.

In one embodiment of the panel, the measuring device comprises at least a sensor which is integrated into a peripheral side of the panel facing the gap. The integration of the sensor into the peripheral side of the panel enables particularly small gap widths. In addition, the integration protects the sensor from damage during storage and transport of the panels and when folding, plugging together or assembling the display device.

With regard to further configurations and advantages of the panel according to the disclosed subject matter, reference is made to the above statements on the display device according to the disclosed subject matter.

In a third aspect, the disclosed subject matter also provides a method for controlling a display device having at least a first and a second panel, each of which comprises luminous elements arranged in rows and columns and which can be aligned with one another to form a gap running parallel to the columns, which method is characterized according to the disclosed subject matter by:

determining, for a row of the first panel, a width of the gap at the level of said row; and controlling at least one luminous element of said row as a function of both a signal to be displayed and the gap width determined for said row.

With regard to the advantages and further embodiments of the method according to the disclosed subject matter, reference is again made to the above statements on the display device according to the disclosed subject matter.

BRIEF DESCRIPTION OF THE DRAWINGS/FIGURES

Figure 2:
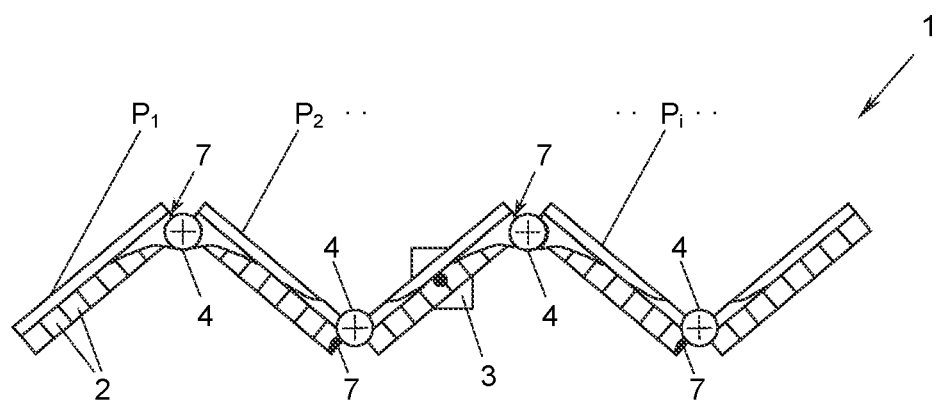
Figure 3:
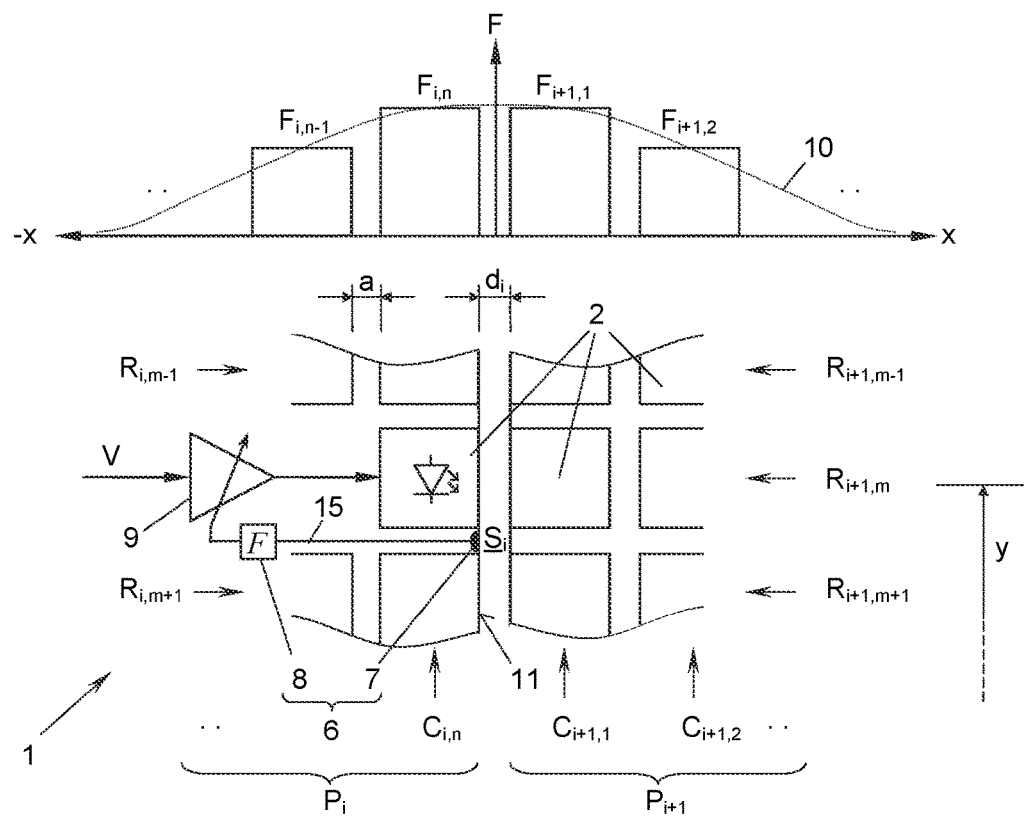
Figure 4:
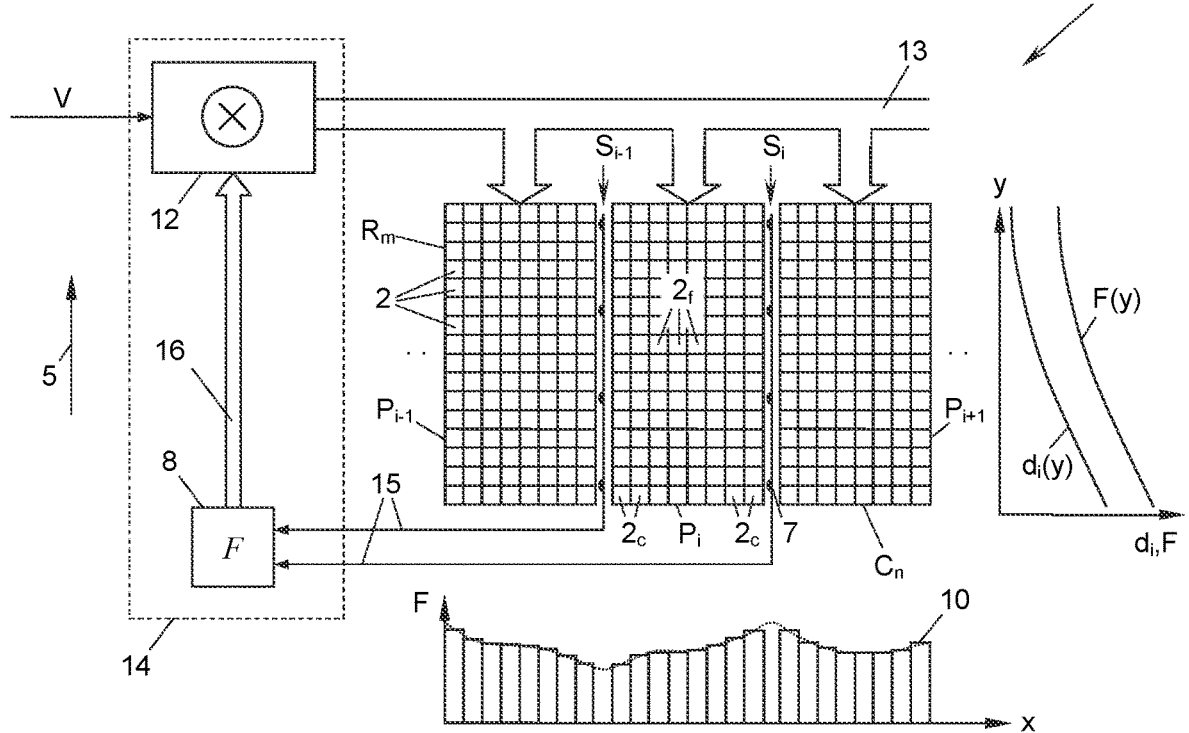

The disclosed subject matter is explained in more detail below with reference to the embodiments shown in the accompanying drawings. In the drawings show:

FIG. 1 a display device according to the disclosed subject matter comprising five panels according to the disclosed subject matter in an aligned position in a front view;

FIG. 2 the display device of FIG. 1 in a folded position in a top view;

FIG. 3 the principle of the brightness control of luminous elements close to the gap of two panels of the display device of FIG. 1 in a schematic representation;

FIG. 4 a block diagram of the display device of FIG. 1; and

Figure 5:
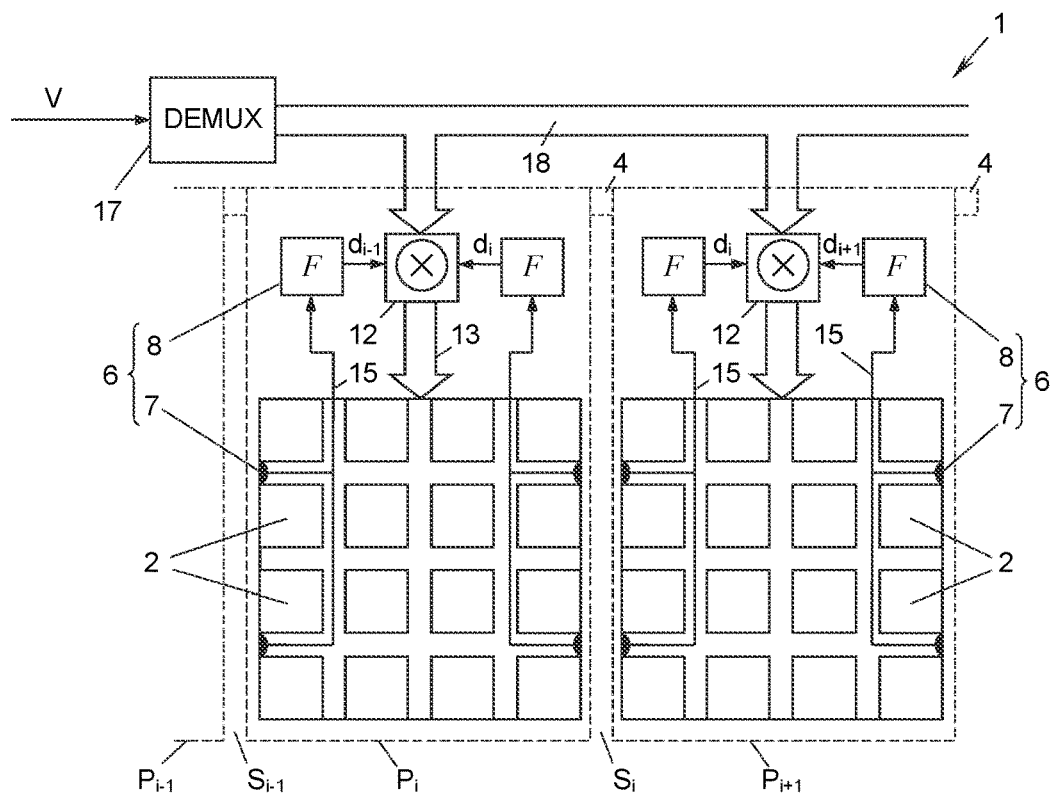
Figure 6:
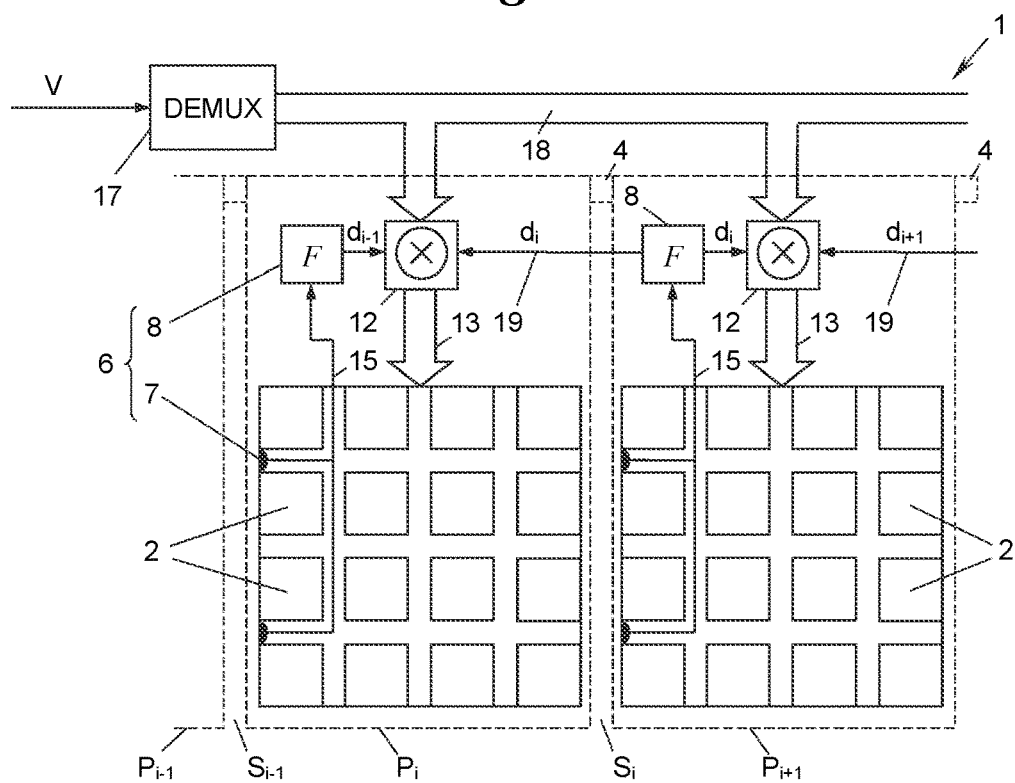
Figure 7:
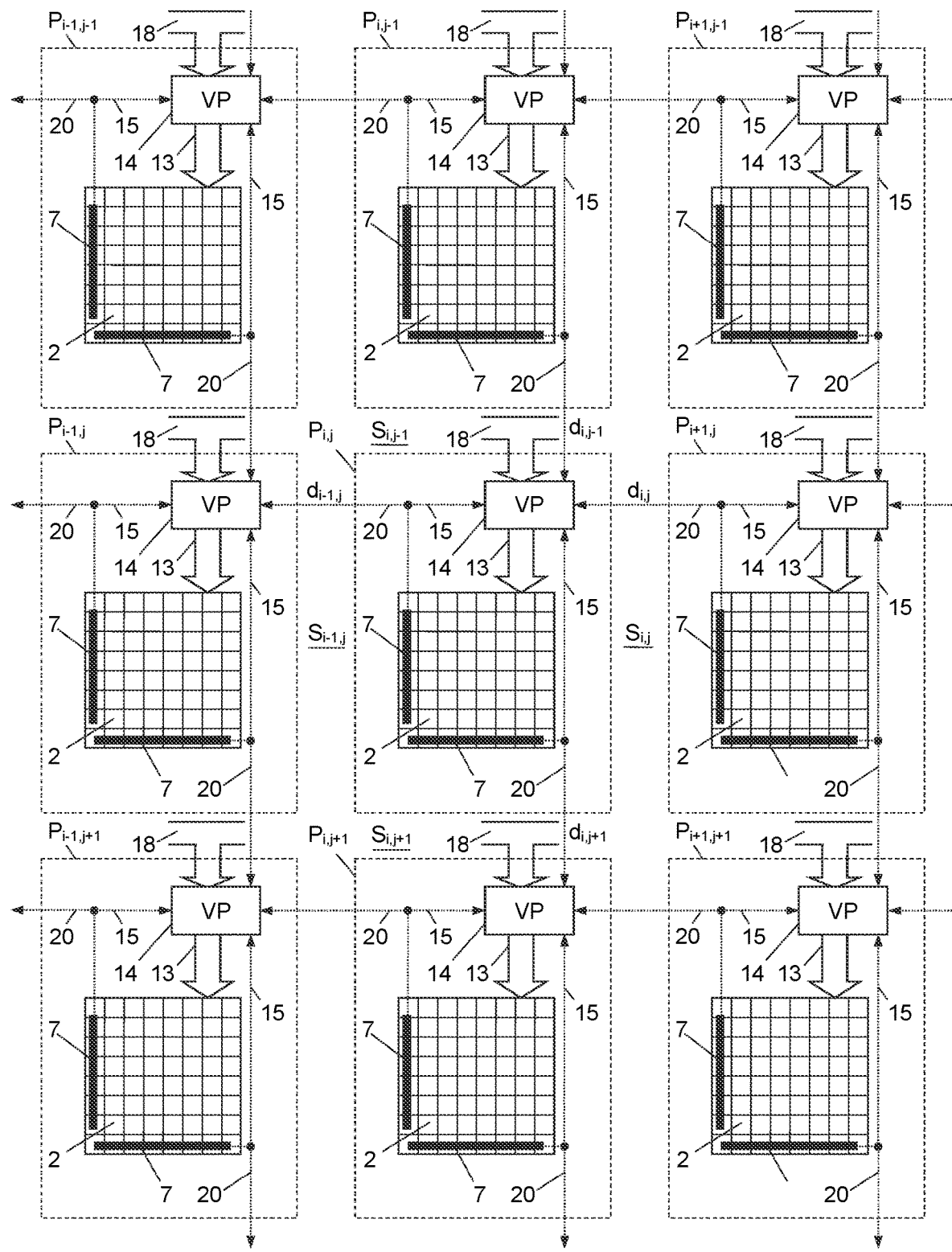

FIGS. 5 to 7 further embodiments of the display device of the disclosed subject matter in the form of sections of block diagrams.

DETAILED DESCRIPTION

According to FIG. 1, a modular display device 1 is composed of a plurality of (here: five) panels $P_i$ (i=1, 2, ... ). Each panel $P_i$ is in turn composed of individual luminous elements 2 arranged in rows $R_m$ (m=1, 2, ... ) and columns $C_n$ (n=1, 2, ... ). In the position shown in FIG. 1, in which they are aligned with one another, the panels $P_i$ jointly form an image area (here in the plane of the drawing) on which image and/or video signals V can be reproduced during operation of the display device 1 by means of the luminous elements 2 (FIGS. 3-7). The image area formed by the aligned panels $P_i$ can be both flat and curved, for example, comprising convex curved panels $P_i$ for electronic advertising columns or public viewing displays or comprising concave curved panels $P_i$ which are arranged around a viewer.

The display device 1 can in principle comprise any number of panels $P_i$ which are arranged next to one another in one (FIGS. 1-6) or two directions (FIG. 7). The display device 1 can be of any size, for example, a video wall in a stadium, an advertising or information board ("digital signage") in public spaces, a portable large screen for concerts, events, etc., a stationary large screen for outdoor, indoor or home theater, etc., down to a small computer or cell phone screen.

Each luminous element 2 represents a pixel of the image area and reproduces a pixel of the image or video signal V. For this purpose, the luminous elements 2 can comprise light-emitting diodes (LEDs), for example, made of organic material (OLEDs) or of inorganic material, for example, discrete LEDs, surface-mounted LEDs (SMD-LEDs), chip on board LEDs (COB-LEDs), micro-LEDs etc. Each light-emitting element $P_i$ can be constructed from an individual light-emitting diode, for example, to reproduce monochrome image or video signals V, or from two or more sub-luminous elements, for example, from a red, a green and a blue light-emitting diode, to reproduce colored image or video signals V.

In the example shown in FIGS. 1 and 2, the display device 1 forms a foldable large screen which is rotatably mounted on a foot 3. For this purpose, the panels $P_i$ are in each case articulated to one another in pairs via connecting elements 4 in the form of joints so that they can be folded onto one another in a zigzag or fan-fold manner; FIG. 2 shows an intermediate position during the fan-fold folding.

Alternatively, the connecting elements 4 could also be rigid, both non-detachable and detachable. In one case, the connecting elements 4 could be formed, for example, by a common (or a plurality of individual) carrier(s), for example, a common base plate or individual connecting straps, on or at which the panels $P_i$ are fixedly or detachably mounted. In another case, the connecting elements 4 could be couplings, for example, rotary, screw or plug-in couplings, via which the panels $P_i$ can be detachably coupled to one another.

As explained at the outset, due to component tolerances, component aging, thermal expansion, weather conditions and necessary bearing clearances to the columns $C_n$, there remain essentially parallel gaps $S_i$ between the panels $P_i$, each having a gap width $d_i$ that can even vary in the longitudinal extension direction 5 or y-direction (FIGS. 3, 4) of the gap $S_i$. FIG. 3 shows a section of the display device 1 in the vicinity of a gap $S_i$ between a first panel $P_i$ and a second panel $P_{i+1}$. When the gap width $d_i$ is greater than the average mutual distance a of the luminous elements 2 in a row $R_m$, particularly for many or all rows $R_m$, the gap $S_i$ is perceptible to a viewer as a dark stripe in the image area, in the opposite case as a light stripe.

FIGS. 3 and 4 show the principle of the optical perception compensation of such gaps $S_i$ in the display device 1. For this purpose, the display device 1 has a measuring device 6 for measuring the gap $S_i$ during operation. As shown in FIG. 3 for an exemplary row $R_m$ of the first panel $P_i$, the measuring device 6, with the aid of a sensor 7 and an evaluation unit 8 connected thereto, determines the gap width $d_i$ at level y of said row $R_m$, that is, $d_{i,m}=d_i(y)$, and thus activates a driver 9 for at least one luminous element 2 of row $R_m$, particularly the luminous element 2 of row $R_m$ closest to the gap. The driver 9 receives the image or video signal V to be displayed by said luminous element 2 and scales it as a function of the gap width $d_{i,m}$ obtained from the measuring device 6 so that the gap $S_i$ next to said luminous element 2 is less perceptible to the viewer, ideally becoming "invisible".

If, for example, the determined gap width $d_{i,m}$ is greater than the average luminous element spacing a, the driver 9 increases the current brightness of the luminous element(s) closest to the gap in row $R_m$, corresponding to the signal V; if it is smaller, the driver 9 reduces said brightness. For this, the driver 9 can control the luminous element(s) 2 in any manner known to those skilled in the art, for example, by means of voltage level control, controllable series resistors or pulse width modulation. The scaling (increase, decrease) of the current brightness of the luminous element(s) 2 corresponding to the signal V can take place, for example, multiplicatively, that is, the driver 9 multiplies the brightness value coded in the signal V for the respective luminous element 2 by a scaling factor F dependent on the gap width, or additively, that is, the driver 9 adds or subtracts from the signal V a value dependent on the gap width.

The display device 1 can comprise an individual measuring device 6 and/or an individual driver 9 for each luminous element 2, only for the luminous elements 2 close to the column or particularly only for the luminous elements 2 closest to the column, that is, on the edge of a panel $P_i$. As a rule, however, one measuring device 6 is sufficient for each gap $S_i$, and the driver 9 can also be a common column driver for all luminous elements 2 of a column $C_n$, which column driver scales the signals V thereof to be displayed using a common factor F.

As shown in the upper diagram of FIG. 3, different scaling factors . . . , $F_{i,n-1}$, $F_{i,n}$, $F_{i,n+1}$, $F_{i,n+2}$, . . . can also be used for the columns . . . , $C_{i,n-1}$, $C_{i,n}$, $C_{i,1}$, $C_{i,2}$, . . . of luminous elements 2 adjacent to the gap $S_i$ of the panels $P_i$, $P_{i+1}$ forming the gap $S_i$, wherein columns $C_{i,n}$, $C_{i+1,1}$ closer to the gap are scaled more strongly than columns $C_{i,n-1}$, $C_{i+1,2}$ further away from the gap, so that a scaling profile 10 results in the direction of the rows $R_m$, see also the lower diagram in FIG. 4. The scaling profile 10 can follow a preselected function, for example, as a function of the gap width $d_{i,m}$, the luminous element spacing a and the absolute spacing $x_s$ from the gap $S_i$. For example, one of the following functions $F(x_s, a, d_{i,m})$ can be selected for the scaling profile 10:

$$F(x_s, a, d_{i,m}) = 1 + \left(\alpha - \beta \frac{d_{i,m} \cdot x_s}{a}\right) \cdot \Theta(x_c - x_s) \text{ or} \quad (1)$$

$$F(x_s, a, d_{i,m}) = 1 + \left(\alpha - \beta \frac{d_{i,m} \cdot x_s}{a} - \gamma \frac{d_{i,m}^2 \cdot x_s^2}{a^2}\right) \cdot \Theta(x_c - x_s) \text{ or} \quad (2)$$

$$F(x_s, a, d_{i,m}) = 1 + \alpha \frac{d_{i,m}}{a} e^{-(x_s/\lambda)^2} \quad (3)$$

wherein $x_c$ is a cutoff distance, $\Theta$ is the Heaviside step function and $\alpha$, $\beta$, $\gamma$ and $\lambda$ are adjustment coefficients.

The sensor 7 can be any distance sensor known in the art, for example, an ultrasonic sensor, a capacitive sensor, an inductive sensor, an optical sensor, a mechanical sensor, for example, a pressure sensor, etc. The sensor 7 can be arranged between the panels $P_i$ delimiting the gap $S_i$ or entirely on one or the other panel $P_i$, or it can have sensor components distributed over said two panels $P_i$, which between one another measure the gap width $d_i$ or $d_i(y)$ or $d_{i,m}$. Optionally, as shown in FIG. 3, the sensor 7 is integrated into the peripheral side 11 of a panel $P_i$ which delimits the gap $S_i$.

In general, there are three variants for the perception compensation of a "too large" ($d_{i,m}>a$) gap $S_i$ at the level of a row $R_m$: Either the brightness of at least one luminous element(s) 2 closer to the gap, for example, a fixed number closest to the gap, is increased relative to the remaining luminous elements 2 in row $R_m$, or the brightness of at least one luminous element 2 further away from the gap, for example, all others in row $R_m$, is decreased relative to the luminous element(s) in the row $R_m$ closest to the gap, or both are done, that is, the brightnesses of the luminous elements 2 closer to the gap and those further away from the gap are controlled relative to one another. This applies vice versa when compensating for a "too small" ($d_{i,m}<a$) gap $S_i$.

In order to avoid overdriving the luminous elements 2 closest to the gap, especially when compensating for the perception of gaps that are too large, the image or video signal V can be reduced in advance in order to create a brightness reserve ("headroom") for the additional brightness of the luminous elements 2 closest to the gap, as a function of the gap width. When the display device 1 comprises a plurality of gaps $S_i$, the video signal V is particularly scaled so that the luminous elements 2 adjacent to the largest gap width $d_{i,m}$ of all rows $R_m$ are not overdriven.

The or each measuring device 6 can comprise only an individual sensor 7 for a gap $S_i$, which sensor measures a uniform gap width $d_i$ for the gap $S_i$ (FIG. 3). When the or each measuring device 6 comprises more than one sensor 7 per gap $S_i$, it is also possible to measure gaps $S_i$ having a width $d_i(y)$ variable in the longitudinal extension direction 5 (y-direction), for example, using two sensors 7, a gap width $d_i(y)$ that widens or narrows linearly in the longitudinal extension direction 5. In the case of two or more sensors 7 per gap $S_i$, said sensors can be arranged discretely, that is, separately, or on a common measuring strip, possibly also as a single continuous measuring strip which measures the profile of the gap width $d_i(y)$ with high resolution.

FIG. 4 shows a measuring device 6 having a plurality of (here: four) sensors 7 per gap $S_i$ and an evaluation unit 8 common to all thereof, which controls a display driver 12 containing the individual luminous element drivers 9, which display driver feeds the image or video signal V, which is scaled as a function of the gaps, to the panels $P_i$ via a bus 13. Evaluation unit 8 and display driver 12 can be implemented, for example, in a video processor 14 as hardware or software components. Each of the four sensors 7 distributed at intervals over the longitudinal extent of the gap $S_i$ measures the width $d_i(y)$ at its respective level y and sends the width to the evaluation unit 8 via a line 15. The evaluation unit 8 determines an associated individual gap width $d_{i,m}$ from the measured gap widths $d_i(y)$ for each row $R_m$ of the panels $P_i$ adjoining the gap $S_i$ and sends said gap width to the display driver 12 via a bus 16.

For example, from the known levels y of the four sensors 7 and the gap widths $d_i(y)$ measured thereby, the evaluation unit 8 can approximate the variation of the gap width $d_i$ along the gap $S_i$ with the aid of a fit function such as a polynomial, splines, etc., and based on said function, interpolate or extrapolate an associated gap width $d_{i,m}$ for each row $R_m$ from the level y of the row $R_m$.

The right diagram of FIG. 4 shows an example of a profile $d_i(y)$ of the width $d_i$ of the gap $S_i$ between the panels $P_i$ and $P_{i+1}$ determined by the evaluation unit 8 and the scaling factor F(y) or $F_{m,i}$ that is a function of said gap width $d_i(y)$ and is used by the driver(s) 9, 12 for scaling the signal V of the luminous element 2 closest to the gap.

In the example of FIG. 4, the luminous elements 2 closest to the gap in the lowermost rows $R_m$ of the panels $P_i$ and $P_{i+1}$ have the largest scaling factor F. To avoid overdriving said luminous elements 2, the drivers 9, 12 scale the signal V in such a way that, at a maximum brightness value encoded in the signal V for said luminous elements 2, said two luminous elements 2 are maximally driven, i.e., without overdriving, and all other luminous elements 2 are driven lower than those two luminous elements 2.

For perceptual compensation of a gap $S_i$, in principle, the luminous elements 2 of only one panel $P_i$ delimiting the gap $S_i$, only the other panel $P_{i+1}$ delimiting the gap $S_i$, or both panels $P_i$, $P_{i+1}$ can be controlled as a function of the gap width.

When a panel $P_i$ has more than one neighboring panel, such as the middle panel $P_i$ in FIG. 4, and thus more than one gap $S_i$ to its neighboring panels $P_{i-1}$, $P_{i+1}$, at least some luminous elements 2 of said panel $P_i$ can also be controlled as a function of the gap widths $d_i$ of more than one gap $S_i$. This will particularly be the case when not only the brightness of the luminous elements $2_c$ closer to the gap (neighbor gap width-dependent) are increased or reduced, but instead (or in addition) the brightness of the luminous elements $2_f$ further away from the gap are reduced or increased relative thereto. In FIG. 4, for example, the driver 12, to compensate for the (here: too small) left gap $S_{i-1}$, reduces the brightness of the luminous elements $2_c$ closest to said gap $S_{i-1}$ and increases the brightness of the (here: too large) luminous elements $2_c$ close to the right gap $S_i$, that is, luminous elements $2_f$ further away from the gap are controlled here as a function of the gap width $d_i$ of the respectively wider of the two gaps $S_i$, $S_{i-1}$.

In a further optional embodiment, the driver 9, 12 moreover couples the brightness of the luminous elements 2 of all panels $P_i$. For this purpose, the driver 9, 12 determines the maximum gap width $d_{max}$ of all gaps $S_i$ for all rows $R_m$ and assigns the maximum drive range to the (corresponding to the signal V) brighter of the two luminous elements 2 delimiting said gap width $d_{max}$ and, to all other luminous elements 2, a drive range for the signal V that is relative thereto, and which is a function of the associated gap width $d_{i,m}$.

In each of the described embodiments, the measuring device(s) 6 can repeatedly determine the gap width(s) $d_i(y)$ or $d_{i,m}$, for example, after each realignment of the panels $P_i$, or continuously during the operation of the display device 1, for example, continuously or at regular time intervals, for example, every hour, minute, second, etc., so that the or each driver 9, 12 scales the respective signal V for the luminous elements 2 as it were dynamically according to the relative position and movement of the panels $P_i$.

FIG. 5 shows a highly modularized embodiment of the display device 1 comprising largely self-sufficient, similar panels $P_i$, which are connected to one another via the connecting elements 4. Each panel $P_i$ has an associated driver 12 and an associated measuring device 6 consisting of sensors 7 and evaluation unit 8. The section of the image or video signal V relating to the respective panel $P_i$ is fed to the drivers 12 from a demultiplexer 17 via a bus 18. The sensors 7 of the panel $P_i$ measure the gap widths $d_{i-1}$, $d_i$ both of the left gap $S_{i-1}$ to the neighboring panel $P_{i-1}$ and the right gap $S_i$ to the neighboring panel $P_{i+1}$, and the evaluation unit 6 determines an associated gap width $d_{i-1,m}$, $d_{i,m}$ for each row $R_m$ of the panel $P_i$ and sends said gap width to the driver 12 of the panel $P_i$. As described above, the driver 12 controls the luminous elements 2 of the panel $P_i$ by scaling the signal V in order to reduce the gap visibility.

FIG. 6 shows an alternative, simplified modularization of the display device 1 having panels $P_i$ communicating with one another. Two adjacent panels $P_i$, $P_{i+1}$ each here share a measuring device 6 for measuring the gap $S_i$ between them. In the example shown, the measuring device 6 of the panel $P_{i+1}$ sends the determined gap widths $d_i$, $d_i(y)$ or $d_{i,m}$ of the gap $S_i$ via a line 19 to the driver 12 of the neighboring panel $P_{i-1}$, so that this can also accordingly activate the luminous elements 2 for perception compensation of the gap $S_i$.

In a further embodiment of the display device of FIG. 6, the line 19 could be omitted, and each driver 12 compensates only that gap $S_{i-1}$ for which it has a measuring device 6.

FIG. 7 shows a further embodiment of the display device 1 comprising communicating panels $P_{i,j}$, which are arranged two-dimensionally, that is, not only horizontally but also vertically next to one another. The sensors 7 of each panel $P_{i,j}$ measure, for example, the width $d_{i-1,j}$ of the gap $S_{i-1,j}$ formed with the left neighboring panel $P_{i-1,j}$ and the width $d_{i,j+1}$ of the gap $S_{i,j+1}$ formed with the lower neighboring panel $P_{i,j+1}$ (the y and x dependencies or row and column indices m, n of the gap widths $d_{i,j}$ are omitted here for the sake of simplicity, but can be taken into account as described above). The panels $P_{i,j}$ send the gap widths $d_{i,j}$ determined thereby via lines 20 to the respective neighboring panel (here: $P_{i,j}$, $P_{i,j+1}$), with which they form the respective gap, so that the number of measuring devices 6 or sensors 7 can be minimized.

In further embodiments of the display device 1, the rows $R_m$ and/or the columns $C_n$ of adjacent panels $P_{i-1,j}$, $P_{i,j}$ or $P_{i,j+1}$, $P_{i,j}$ may also not be exactly aligned with one another in rows or columns (not shown). Furthermore, it is also possible for two or more neighboring panels to adjoin a peripheral side 11 of a panel $P_{i,j}$. For example, two panels $P_{i+1,j}$ can adjoin the peripheral side 11 of the first panel $P_{i,j}$, which are, for example, only half as high as the first panel $P_{i,j}$ and/or which partially protrude beyond the peripheral side 11. In general, the panels $P_{i,j}$ of the display device 1 do not all need to have the same shape or size, but can also be different, for example, in the form of rectangles of different dimensions.

Conclusion

The disclosed subject matter is not restricted to the illustrated embodiments, but rather encompasses all variants, modifications and combinations thereof which fall within the scope of the attached claims.

What is claimed is:

1. A display device, comprising
at least a first and a second panel, each of which comprises luminous elements arranged in rows and columns and which can be aligned with one another to form a gap running parallel to the columns,
at least one connecting element for holding the panels in their aligned position,
a measuring device which is configured to determine, for each row of the first and the second panel, a width of the gap at the level of said row, and
a driver which receives a signal to be displayed and is connected to the measuring device and all luminous elements of the first and the second panel, which driver is configured to control said luminous elements as a function of the signal and to increase the brightness of at least one luminous element closer to the gap relative to the brightness of at least one luminous element further away from the gap in each row when the determined gap width at the level of said row is greater than an average distance between the luminous elements in said row, and to decrease said brightness when the determined gap width at the level of said row is smaller than the average distance between the luminous elements in said row,
wherein the driver is configured to scale the signal in such a way that the luminous elements closest to the gap in the row with the largest gap width determined are, at a maximum brightness value encoded in the signal for these luminous elements, driven at their maximum brightness without overdriving and all other luminous elements are driven lower than these luminous elements.

2. The display device according to claim 1, wherein the connecting element is a joint, via which the panels can be pivoted between the aligned position and a folded position.

3. The display device according to claim 1, wherein the connecting element is a coupling via which the panels are detachably connected.

4. The display device according to claim 1, wherein the measuring device is configured to continuously determine said gap width during operation of the display device.

5. The display device according to claim 1, wherein the measuring device comprises at least two sensors spaced from one another in the longitudinal extension direction of the gap, the first of which measures a first width of the gap at the level of the first sensor, and the second of which measures a second width of the gap at the level of the second sensor, wherein the measuring device is configured to determine the gap width at the level of each row on the basis of the measured first and second widths.

6. The display device according to claim 1, wherein the display device comprises a third panel which can be aligned with the first panel to form a further gap, wherein the measuring device is configured to also determine a width of the further gap, and wherein the driver is configured to control said luminous elements also as a function of the determined width of the further gap.

7. A panel, which comprises luminous elements arranged in rows and columns and can be aligned with at least one second panel to form a gap running parallel to the columns, further comprising:
a measuring device which is configured, for each row of the panel, to determine a width of the gap at the level of said row, and
a driver which receives a signal to be displayed and is connected to the measuring device and all luminous elements of the panel, which driver is configured to control said luminous elements as a function of the signal and to increase the brightness of at least one luminous element closer to the gap relative to the brightness of at least one luminous element further away from the gap in each row when the determined gap width at the level of said row is greater than an average distance between the luminous elements in said row, and to decrease said brightness when the determined gap width at the level of said row is smaller than the average distance between the luminous elements in said row,
wherein the driver is configured to scale the signal in such a way that the luminous element closest to the gap in the row with the largest gap width determined is, at a maximum brightness value encoded in the signal for this luminous element, driven at their maximum brightness without overdriving and all other luminous elements are driven lower than this luminous element.

8. The panel according to claim 7, wherein the measuring device comprises at least a sensor which is integrated into a peripheral side of the panel facing the gap.

9. The panel according to claim 7, wherein the panel is configured to receive a width of a gap between the panel and a further panel from the further panel and to control its luminous elements as a function of the received gap width.

10. The panel according to claim 7, wherein the panel can be aligned with a third panel to form a further gap, wherein the measuring device is configured to also determine a width of the further gap, and wherein the driver is configured to control said luminous elements also as a function of the determined width of the further gap.

11. A method for controlling a display device which has at least a first and a second panel, each of which has luminous elements arranged in rows and columns and which can be aligned with one another to form a gap running parallel to the columns, comprising:
determining, for each row of the first and the second panel, a width of the gap at the level of said row; and
controlling at least one luminous element of each row as a function of both a signal to be displayed and the gap width determined for said row;
wherein, in said controlling, in each row the brightness of at least one luminous element closer to the gap is increased relative to the brightness of at least one luminous element further away from the gap when the determined gap width at the level of said row is greater than an average distance between the luminous elements in said row, and is decreased when the determined gap width at the level of said row is smaller than the average distance between the luminous elements in said row; and
wherein the signal is scaled in such a way that the luminous elements closest to the gap in the rows with the largest gap width determined are, at a maximum brightness value encoded in the signal for these luminous elements, driven at their maximum brightness without overdriving and all other luminous elements are driven lower than these luminous elements.

12. The method according to claim 11, wherein said determining and said controlling are carried out repeatedly during operation of the display device.

13. The method according to claim 11, wherein the display device comprises a third panel which can be aligned with the first panel to form a further gap, characterized in that in said determining, a width of the further gap is determined, and in said controlling, said luminous elements are also controlled as a function of the determined width of the further gap.

* * * * *